(12) United States Patent
Tsirkin

(10) Patent No.: US 10,503,405 B2
(45) Date of Patent: Dec. 10, 2019

(54) ZERO COPY MEMORY RECLAIM USING COPY-ON-WRITE

(71) Applicant: Red Hat Israel, Ltd., Raanana (IL)

(72) Inventor: Michael Tsirkin, Yokneam Illit (IL)

(73) Assignee: Red Hat Israel, Ltd., Raanana (IL)

(*) Notice: Subject to any disclaimer, the term of this patent is extended or adjusted under 35 U.S.C. 154(b) by 108 days.

(21) Appl. No.: 14/619,006

(22) Filed: Feb. 10, 2015

(65) Prior Publication Data

US 2016/0231929 A1 Aug. 11, 2016

(51) Int. Cl.
*G06F 3/06* (2006.01)

(52) U.S. Cl.
CPC ............ *G06F 3/061* (2013.01); *G06F 3/0634* (2013.01); *G06F 3/0659* (2013.01); *G06F 3/0664* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,403,974 B1 | 7/2008 | Harris | |
| 7,454,477 B2 | 11/2008 | Talluri et al. | |
| 7,849,274 B2 | 12/2010 | Pittman | |
| 7,917,539 B1 | 3/2011 | Srinivasan et al. | |
| 8,327,187 B1* | 12/2012 | Metcalf | G06F 9/5022 714/10 |
| 8,490,207 B2 | 7/2013 | Layton et al. | |
| 8,667,187 B2 | 3/2014 | Thakkar | |
| 8,850,091 B1* | 9/2014 | Karamcheti | G06F 12/0246 710/62 |
| 2004/0210695 A1* | 10/2004 | Weber | G06F 9/526 710/240 |
| 2007/0008902 A1* | 1/2007 | Yaramada | H04L 12/5695 370/252 |
| 2008/0155571 A1* | 6/2008 | Kenan | G06F 9/542 719/326 |
| 2008/0209203 A1* | 8/2008 | Haneda | G06F 21/72 713/150 |

(Continued)

OTHER PUBLICATIONS

Hartman, Greg "Virtual Memory in Today's Operating Systems," Downloaded Jan. 2, 2015, http://www.cs.cmu.edu/~gghartma/sssg-vm-intro.pdf.

(Continued)

*Primary Examiner* — Henry Tsai
*Assistant Examiner* — Christopher A Bartels
(74) *Attorney, Agent, or Firm* — Lowenstein Sandler LLP

(57) ABSTRACT

A processing device receives a request to provide a hardware device with direct memory access to a contents of a virtual memory location in application memory of an application. Responsive to the request, the processing device locks the virtual memory location. The processing device makes a determination to reclaim a physical memory location mapped to the virtual memory location. The processing device then determines whether the hardware device has completed the access to a physical memory location mapped to the virtual memory location. Responsive to determining that the hardware device has not completed the access to the physical memory location, the processing device implements a copy-on-write policy for the virtual memory location.

20 Claims, 5 Drawing Sheets

(56) References Cited

U.S. PATENT DOCUMENTS

| | | | |
|---|---|---|---|
| 2008/0316921 A1* | 12/2008 | Mathews | H04L 47/10 370/230 |
| 2008/0320254 A1* | 12/2008 | Wingard | G06F 12/0607 711/157 |
| 2009/0228535 A1* | 9/2009 | Rathi | G06F 3/048 |
| 2012/0210095 A1* | 8/2012 | Nellans | G06F 12/1072 711/206 |
| 2013/0159650 A1* | 6/2013 | Wakamiya | G06F 3/065 711/162 |
| 2014/0195632 A1 | 7/2014 | Hunter et al. | |
| 2014/0195739 A1* | 7/2014 | Yu | G06F 9/544 711/133 |
| 2015/0162068 A1* | 6/2015 | Woo | G11C 11/40615 365/222 |
| 2016/0104522 A1* | 4/2016 | Son | G11C 11/005 711/103 |
| 2016/0154756 A1* | 6/2016 | Dodson | G06F 13/4022 710/316 |
| 2017/0187846 A1* | 6/2017 | Shalev | H04L 69/22 |
| 2017/0322828 A1* | 11/2017 | Panicker | G06F 9/45558 |
| 2018/0089881 A1* | 3/2018 | Johnson | G06F 9/45558 |

OTHER PUBLICATIONS

Calhoun, Michael "Characterization of Block Memory Operations," Published Apr. 2006, Rice University, Houston, Texas, http://www.cs.rice.edu/CS/Architecture/docs/msthesis-calhoun.pdf.

* cited by examiner

ZERO COPY MEMORY RECLAIM USING COPY-ON-WRITE

TECHNICAL FIELD

Embodiments of the present invention relate to zero copy memory techniques and, more specifically, to reclaiming zero copy memory using copy-on-write.

BACKGROUND

In traditional networking, data is transferred from a memory page allocated to an application to a socket buffer for transmission by a network interface controller (NIC) to a remote device. The socket buffer is typically maintained in memory to which the NIC can get direct memory access (DMA). The act of copying the data from the memory page allocated to the application to the socket buffer directly accessible to the NIC introduces transport overhead.

To mitigate the transport overhead introduced by copying the data from the memory page allocated to the application to the socket buffer, some protocols use a zero copy technique. In the zero copy technique, the NIC is granted direct memory access to the memory page that is in use by the application. Until the NIC completes transmission of the data from the memory page, the application can neither release the memory page nor modify the physical memory location. In some instances, there may be a significant delay between when the NIC is granted DMA to the memory page and when the NIC transmits the data at the memory page. Accordingly, the use of zero copy techniques for transmitting data can be problematic.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
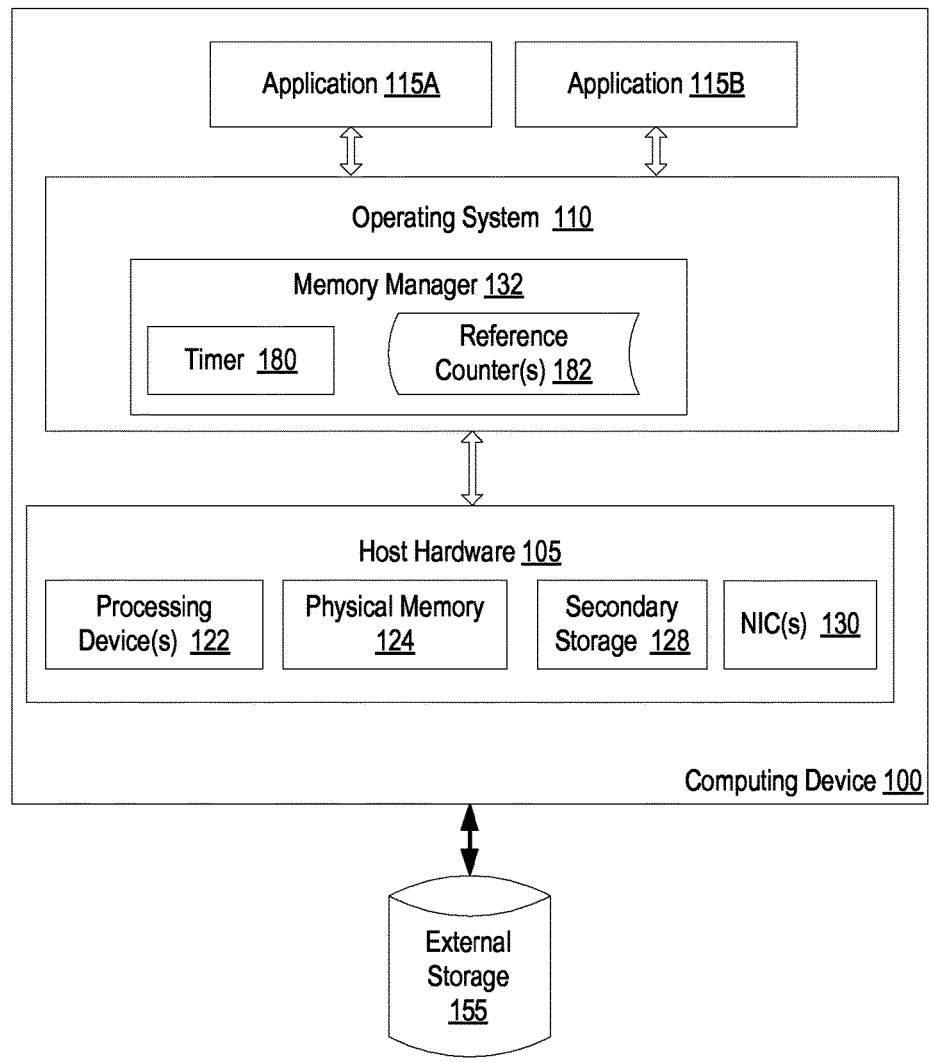
FIG. 1 is a block diagram that illustrates an embodiment of a computing device that hoses one or more applications.

Described herein are a method and system for providing zero copy transmission of memory page contents without preventing the memory page from being modified. To implement zero copy transmission of a memory page's contents, the memory page is locked or pinned, thus ensuring that the memory page will not be paged out or moved to a new physical location until after the zero copy transmission is complete. Locking or pinning the memory page means that the memory page prevented from being swapped out to secondary storage. In embodiments, a timer is started when the memory page is locked. The timer may be used to make a determination to reclaim the memory page. If the timer expires before the transmission is complete, this indicates that the transmission is taking too long, and that it may cause delays with regards to an application using the memory page. Accordingly, if the timer expires before the transmission is complete, the lock on the memory page is removed. Alternatively, the determination to reclaim the memory page may be made based on a request from an application, or other condition or event. Additionally, a copy-on-write policy is implemented for the memory page. This enables the application using the memory page to modify the contents of memory page without corrupting the data being transmitted. Accordingly, the memory page may be reclaimed and used for additional purposes by the application while the contents of the memory page are being transmitted via a zero copy transmission to a remote device. Thus, transmission overhead is reduced while at the same time ensuring that memory pages will not be indefinitely pinned.

In one embodiment, an operating system or hypervisor receives a request from an application or a guest of a virtual machine to provide a hardware device with direct memory access to a memory location. For example, a request for a NIC to perform a zero copy transmission of the contents of the memory page may be received. Responsive to the request, a processing device may grant access for the hardware device to a physical memory location mapped to the memory page, lock the memory page and start a timer. Alternatively, the hardware device may already have access to the physical memory location. After making the determination to reclaim the memory page (e.g., expiration of the timer), the processing device determines whether the hardware device has completed the access to the physical memory location (e.g., whether the NIC has completed the zero copy transmission). Responsive to determining that the hardware device has not completed the access to the physical memory location, the processing device implements a copy-on-write policy for the memory page.

At some later time, the processing device may detect a page fault responsive to a new request from the application to release the memory page or to modify the contents of the memory page. The processing device again determines whether the hardware device has completed the access to the physical memory location. If the hardware device has completed the access, then the copy-on-write policy is removed from the memory page, and the application is allowed to release or modify the contents of the memory page. If the hardware device has not completed the access, a request to release the memory page is denied. Additionally, if the hardware device has not completed the access, responsive to a request to modify the contents of the memory page, the processing device performs a copy-on-write operation for the memory page.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring embodiments of the present invention.

FIG. 1 is a block diagram that illustrates an embodiment of a computing device 100 (e.g., a host machine) that hosts one or more applications 115A-115B. The applications may be traditional applications such as word processing applications, server applications, spreadsheet applications, and so on. The applications may additionally be virtual machines (VMs). The computing device 100 may be a rackmount server, a workstation, a desktop computer, a notebook computer, a tablet computer, a mobile phone, a palm-sized computing device, a personal digital assistant (PDA), etc. The computing device 100 includes host hardware 105, which may include one or more processing devices 122, physical memory 124, secondary storage 128, one or more network interface controllers 130 (NICs, also referred to as network interface cards), and other hardware components (e.g., I/O devices).

Processing device 122 represents one or more general-purpose processing devices such as a microprocessor, central processing unit, or the like. More particularly, the processing device 122 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 122 may also be one or more special-purpose processing devices such as an application specific integrated circuit (ASIC), a field programmable gate array (FPGA), a digital signal processor (DSP), network processor, or the like. The physical memory 124 may include volatile memory devices (e.g., random access memory (RAM)), non-volatile memory devices (e.g., Flash memory, read only memory (ROM), etc.), and/or other types of memory devices. The secondary storage 128 may include mass storage devices, such as magnetic or optical storage based disks, tapes and/or hard drives. NIC 130 is a device capable of implementing a physical layer and data link layer standard (such as Ethernet or InfiniBand). The host hardware 105 may also be coupled to external storage 155 via a direct connection or a local network. The computing device 100 may be a single machine or multiple host machines arranged in a cluster.

The computing device 100 hosts an operating system (OS) 110. The operating system 110 manages the host hardware 105 as well as software resources, and provides services for applications 115A-115B. In one embodiment, OS 110 includes a memory manager 132.

Memory manager 132 is responsible for managing the allocation of memory (e.g., physical memory and/or virtual memory) for the operating system 110, for applications 115A-115B, and for hardware devices (e.g., NICs 130). Memory manager 132 may perform operations such as allocating memory, mapping physical memory locations (e.g., physical memory pages) to virtual memory locations (e.g., virtual memory pages), freeing up unused memory locations (e.g., performing garbage collection on unused memory pages), and so on. Memory manager 132 may separate physical memory from virtual memory to effectively increase the amount of available memory through the use of paging (or swapping) some memory to secondary storage 128. Each application 115A-115B may have its own virtual memory space of contiguous virtual memory addresses. Each virtual memory address maps to a physical address either in physical memory 124 or in a swap space in secondary storage 128.

Memory manager 132 in some instances grants direct memory access (DMA) of physical memory locations to hardware devices (e.g., to NICs 130, secondary storage 128, graphics cards, sound cards, other physical memory, processing devices, etc.). DMA enables a hardware device to access physical memory 124 independently of processing device 122. Without DMA, the processing device 122 is typically utilized for reading to or writing from a memory location in physical memory until the read or write is complete, and thus is unable to perform other operations during this time. In contrast, the use of DMA enables the processing device 122 to initiate the read or write operation, and let the hardware device communicate directly with the physical memory location for the duration of the read or write process. The processing device 122 may then perform other operations while the read or write is being performed. Once the hardware device completes the read or write operation, a DMA controller (not shown) may issue an interrupt to the processing device to notify the processing device that the read or write operation is complete. The use of DMA may significantly reduce the processor overhead associated with transferring data in and out of physical memory 124.

Many operations (e.g., read and write operations) involve processing device 122 and/or other hardware devices copying data from one physical memory location in physical memory 124 to another physical memory location in physical memory 124. For example, in order for an NIC 130 to transfer data to a remote computing device, that data would initially be transferred from a physical memory location mapped to a virtual memory space of an application 115A-115B to a data buffer (e.g., a socket buffer) before transmission. The data buffer is a region of physical memory 124 used to temporarily store data while that data is being moved from one location to another. A hardware device such as NIC 130 may have direct memory access to the data buffer, thus reducing processor overhead. However, overhead is still introduced by the process of copying the data from the memory space of the application 115A-115B to the data buffer. For example, about 15-20% of transport overhead is caused by copying data to the data buffer.

To further reduce transport overhead, memory manager 132 provides zero-copy data transfer capability. A zero-copy operation is an operation in which data is not copied into a data buffer during the operation. For example, for a zero-copy data transfer data is not copied into a socket buffer prior to the NIC 130 transmitting that data to a remote computing device. Instead, memory manager 132 grants for NIC 130 direct memory access (DMA) to the physical memory locations holding the data, which may be allocated to an application 115A-115B. This enables the NIC to directly access the physical memory locations storing the data without the processing device 122 making any copies of the data, which further reduces transport overhead.

Memory manager 132 should ensure that the data in the physical memory location does not change during a zero copy transmission. Accordingly, memory manager 132 typically locks or pins a virtual memory page to physical memory (e.g, to a physical memory page). While the virtual memory page is pinned or locked to a physical memory page that virtual memory page will not be swapped out to secondary storage or mapped to a different physical memory page.

In some instances, there is a delay between when an application requests for a NIC 130 to perform a zero copy transmission and when the NIC 130 completes the zero copy transmission. For example, if the zero copy transmission is performed by a low priority process while a higher priority process is sending and/or receiving data, no or few system resources may be allocated to the NIC 130 for the zero copy transmission until the higher priority process completes its operations. This may occur, for example, if a zero copy transmission is performed for a database application while a high priority latency sensitive application (e.g., a voice over internet protocol (VOIP) application) is executing. Thus, the zero copy transmission may be starved of system resources. As a result, the physical memory location (and virtual memory location mapped to that physical memory location)

may remain locked and unchangeable for an indeterminate amount of time, during which the memory location may not be modified or used for other purposes.

Memory manager 132 is able to reclaim the virtual memory location (e.g., virtual memory page) for the application 115A-115B during a zero copy transmission. This enables the application 115A-115B to modify the virtual memory location contents, thus preventing the application 115A-115B from stalling as a result of the zero copy transmission.

In one embodiment, memory manager 132 initiates a timer 180 when the zero copy transmission is initiated (e.g., when direct memory access to the virtual memory location containing data to be transferred is requested for NIC 130). Alternatively, the application 115A-115B may initiate a timer. This timer 180 may be used to determine whether the zero copy transmission is taking too long to complete. At any time before the timer expires (times out), NIC 130 may complete the transmission and issue an interrupt to the processing device 122 indicating transmission completion (or cause a DMA controller to issue such an interrupt). In response, memory manager 132 may unlock/unpin the virtual memory page. The virtual memory page and physical memory page may then be reused and/or modified.

If the timer expires prior to completion of the zero copy transmission, then memory manager 132 may perform operations to unlock/unpin the virtual memory page from the physical memory page. This enables the virtual memory page to be reused and/or modified, swapped out to secondary storage, etc. In one embodiment, memory manager 132 performs an additional check as to whether the NIC has completed the zero copy data transfer prior to performing the operations.

The operations performed when the timer expires include implementing a copy-on-write policy for the virtual memory location. Implementing a copy-on-write memory mapping policy may involve mapping of the same physical memory page into address spaces of one or more application and/or hardware device (e.g., a NIC) which may be unaware of the shared use of the memory page. A memory page in a copy-on-write state may be write-protected, so that an attempt to modify the page would cause a page fault. When the process or hardware device sharing a copy-on-write memory page attempts to modify the shared memory page, a page fault exception is triggered, and a copy of the page is created and mapped into the address space of the process (or the virtual machine), so that the application or hardware device would modify the newly created copy. The mapping is transparent, for example to both an application attempting the memory page modification and a hardware device (e.g., NIC) that has direct memory access to the memory page. Alternative to write protecting the virtual memory location, memory manager 132 may unmap the physical memory location previously mapped to the virtual memory location from application memory.

In one embodiment, no timer is used to make a determination to reclaim the physical memory location mapped to the virtual memory location (e.g., to detect a need to reclaim the physical memory location). Instead, the determination to reclaim the physical memory location may be based on other data, such as based on a request from an application to reclaim the virtual memory location that maps to the physical memory location and/or a request to reclaim the physical memory location.

After implementing the copy-on-write policy for the memory location, the memory manager 132 can then unpin/unlock the virtual memory location from the physical memory location without risk that the contents of the physical memory location will change prior to those contents being transmitted to a remote computing device. The virtual memory location may not initially have a copy-on-write policy (and so may not initially be write protected ]) because write protecting a memory location is typically a slow operation. To write protect a virtual memory location, one or multiple caches are first flushed to ensure that the contents of the physical memory location mapped to that virtual memory location are accurate and not stale. Accordingly, by waiting until the timer expires or another condition occurs (e.g., a request to reclaim the memory page is received) to implement the write protection, write protection is only performed for memory pages for which there is a delay. Delays should be rare, and so only a small fraction of memory pages will be write protected in most instances.

If the application 115A-115B attempts to access the virtual memory location after implementation of the copy-on-write policy, then a page fault is generated. Responsive to the page fault, memory manager 132 may again check whether the NIC has completed the zero copy transmission. If the transmission has completed, then memory manager 132 removes the copy-on-write policy of the virtual memory location (e.g., by enabling read/write for the virtual memory location). The application 115A-115B may then access the virtual memory location as per usual. If the transmission has not completed, memory manager 132 may still proceed as though the transmission had completed, and enable the application 115A-115B to modify the virtual memory location contents through a copy-on-write operation. Accordingly, when the application 115A-115B attempts to modify the virtual memory location, a copy of the physical memory location mapped to the virtual memory location is created and mapped to the virtual memory location in the address space of the application. The contents of the virtual memory location (and thus of the new physical memory location) is then modified in accordance with the application's access request. The mapping is transparent to both the application attempting the memory location modification and the NIC 130 sharing the physical memory location. Once the NIC 130 completes the data transfer, the copy-on-write policy (and thus write protection) may be removed from the virtual memory location. The physical memory location may then be reclaimed in standard garbage collection for reuse.

In one embodiment, memory manager 132 uses reference counters 182 to keep track of applications and hardware devices that have virtual memory spaces mapped to particular physical memory pages. The reference count represents the number of entities (e.g., applications, threads, processes, devices, etc.) that refer to a specific area of memory (e.g., to a specific physical memory page). Memory manager 132 may additionally use the reference counters 182 to determine whether an NIC 130 has completed a zero copy transmission.

Each memory page structure may have a reference count. An unused physical memory page has a reference count of 0. When an application or process maps to a physical memory page, the reference count for that physical memory page increases by 1. Additionally, when a virtual memory page is pinned/locked to a physical memory page, this increases the reference count for that physical memory page by 1, which may signify that the physical memory page has been mapped to a NIC 130 or other hardware device. Thus, physical memory pages that are mapped to a single application 115A-115B have a reference count of 1. Physical memory pages that are mapped to two applications 115A-

115B or to an application and a hardware device (e.g., NIC 130) have a reference count of 2.

If the memory manager 132 attempts to swap out a virtual memory page to secondary storage, it will unmap the associated physical memory page from application memory (the virtual address space of the application) and reduce the reference count for that physical memory page by 1. Memory manager 132 may then check the reference count of that physical memory page. If the reference count is above zero, then memory manager 132 will not swap the contents of the physical memory page into swap space and will not discard the contents of the physical memory page.

If the memory manager 132 receives a request to modify the write protected virtual memory page, memory manager 132 performs a check on the reference count for the associated physical memory page. If the reference count for the physical memory page has been reduced to 1, this signifies that only the application is using the physical memory page, and the copy-on-write policy for the virtual memory page is removed. If the reference count is 2 or more, then a copy-on-write operation is performed on the virtual memory page.

Once the NIC 130 completes the zero-copy transmission, memory manager 132 may reduce the reference count to the physical memory page (e.g., down to 1). When the application next tries to update the virtual memory page, a page fault may be created. Responsive to the page fault, memory manager 132 may check the reference count on the physical memory page mapped to the virtual memory page. If the reference count for the physical memory page is 1, this signifies that only the application is mapped to the physical memory page. Thus, if the reference count is 1 the memory manager 132 may enable write permissions for the virtual memory page and the application can modify the virtual memory page (and the associated physical memory page). Alternatively, memory manager 132 may enable write permissions for the virtual memory page responsive to the NIC completing the zero copy transmission.

In one embodiment, a zero copy transmission is only performed if a single application (and no hardware devices) is using a physical memory page whose contents are to be transmitted. Thus, when the zero copy transmit request is received for a virtual memory page, memory manager 132 may check the reference count for a physical memory page mapped to that virtual memory page. If the reference count is 2 or more (indicating that two or more applications and/or hardware devices are using the physical memory page, then a zero copy transmit operation is not allowed). Instead, memory manager 132 may copy contents of the virtual memory page to a socket buffer (or other data buffer), and grant access of the memory pages associated with the socket buffer to the NIC 130.

Figure 2:
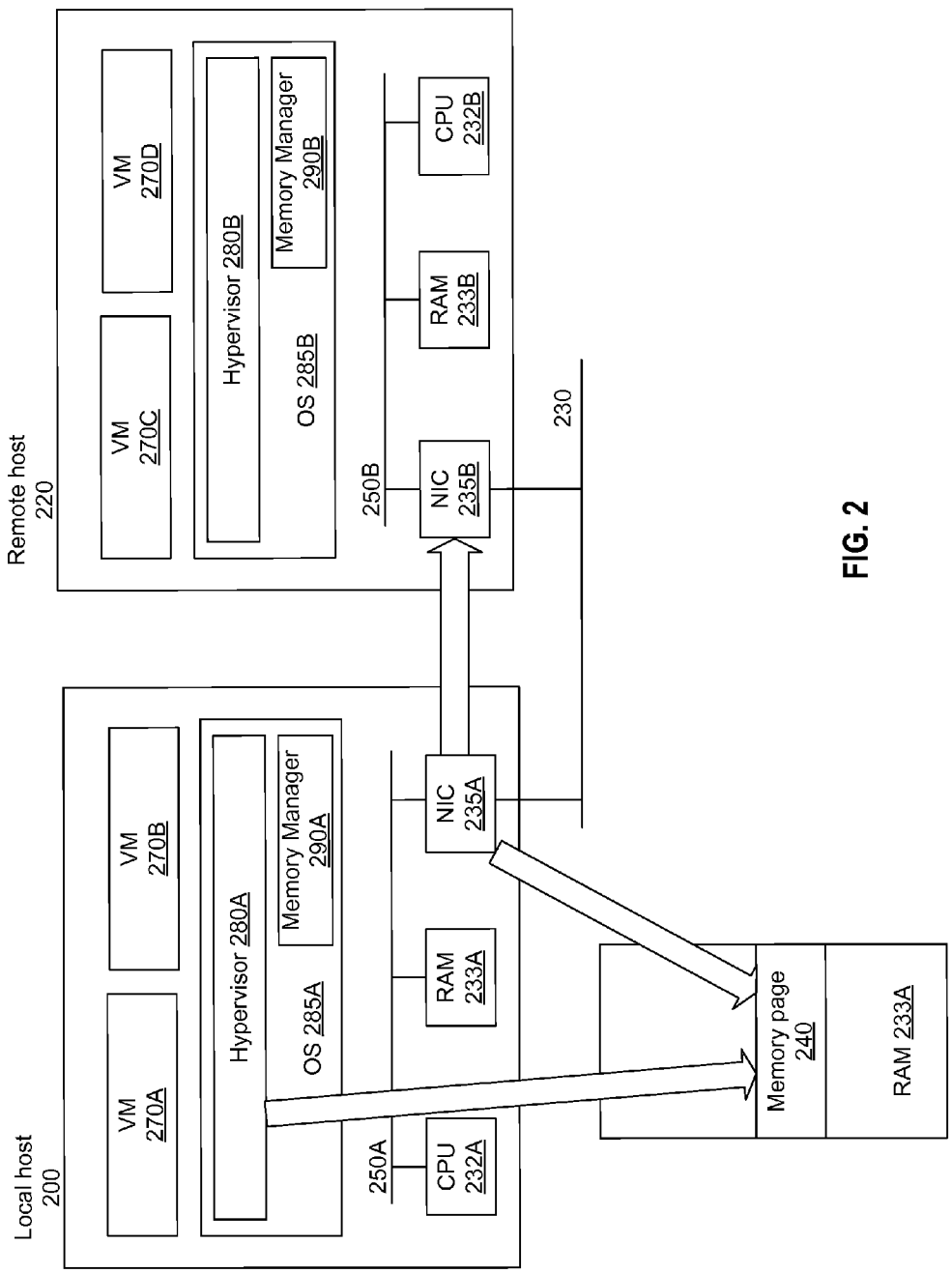
FIG. 2 is a block diagram that illustrates an embodiment of a NIC of a local host that performs a zero copy transmission of data to a remote host.

FIG. 2 is a block diagram that illustrates an embodiment of a NIC 235A of a local host 200 that performs a zero copy transmission of data to a remote host 220. Local host 200 may be interconnected, via a network 230, with remote host 220. Local host 200 may comprise one or more processing devices (e.g., central processing unit (CPU) 232A) communicatively coupled to a memory device (e.g., random access memory (RAM) 233A) and a network interface controller (NIC) 235A. Local connections within local host 200, including connections between CPU 232A, RAM 233A, and NIC 235A, may be provided by one or more local buses 250A of a suitable architecture.

In an illustrative example, as schematically illustrated by FIG. 2, local host 200 may run multiple virtual machines (VMs) 270A-270B by executing a software layer between the hardware and the virtual machines. The software layer is a hypervisor 280A, also known as a virtual machine monitor (VMM). In certain implementations, hypervisor 280A may be a component of operating system 285 executed by local host 200. Alternatively, hypervisor 280A may be provided by an application running under host operating system 285, or may run directly on the local host 200 without an operating system beneath it. Hypervisor 280A may abstract the physical layer, including processors, memory, and I/O devices, and present this abstraction to virtual machines 270A-270B as virtual devices, including virtual processors, virtual memory, and virtual I/O devices. In another illustrative example (e.g., as shown in FIG. 1), local host 200, instead of executing virtual machines 270A-270B, may run one or more non-virtualized applications on operating system 285A.

Local host 200 hosts any number of virtual machines (VM) 270A-270B (e.g., a single VM, one hundred VMs, etc.). A virtual machine is a combination of guest software that uses an underlying emulation of the host machine (e.g., as provided by hypervisor 280A). The guest software may include a guest operating system, guest applications, guest device drivers, etc. Virtual machines 270A-270B can be, for example, hardware emulation, full virtualization, para-virtualization, and operating system-level virtualization virtual machines. The virtual machines may have the same or different guest operating systems, such as Microsoft® Windows®, Linux®, Solaris®, etc.

Remote host 220 may be another host machine similar to local host 200. Remote host 220 may include a hardware layer including one or more processing devices (e.g., CPU 232B), memory (e.g., RAM 233B), and a NIC 235B connected via one or more local buses 250B. Remote host 220 may additionally include an operating system 285B, a hypervisor 280B hosting one or more virtual machines 270C-270D, a memory manager 290B, and so on. Remote host 220 may be substantially similar to local host 200. Both local host 200 and remote host 220 may correspond to computing device 100 in embodiments.

Local host 200 and/or remote host 220 may include a memory manager 290A, 290B that implements a virtual memory system where pages of an address space of a process or a virtual machine are mapped to physical memory. Memory managers 290A-290B may be components of hypervisors or of operating systems. The address space virtualization may be handled through the processor's paging mechanism. Paging may support a virtual memory environment where a large linear address space is simulated with a smaller amount of random access memory (RAM) and some disk storage (swap space). Each memory segment may be divided into pages of a defined size (e.g., 4 KB) which may be stored either in physical memory or on the disk. The operating system may maintain a page directory and a set of page tables to keep track of the pages. When a process attempts to access an address location in the linear address space, the processor may use the page directory and page tables to translate the linear address into a physical address. If the page being accessed is not currently in physical memory, the processor may generate a page fault exception, and the operating system may then read the page from the disk and continue executing the thread. The processor may also generate a page fault exception if the memory page being accessed is write-protected (e.g., by setting a flag in the page table).

In certain implementations, local host 200 and/or remote host 220 may support zero copy transmissions. In such an implementation, memory manager 290A or memory manager 290B may perform one or more operations to facilitate the zero copy transmission responsive to a request from a guest of a VM 270A-270B for NIC 235A to perform the zero copy transmission. For example, a physical memory page 240 may be mapped to a virtual memory space of VM 270A. Accordingly, VM 270A may have access to the physical memory page 240 via hypervisor 280A. NIC 235A may request to perform a zero copy transmission of the contents of a virtual memory page mapped to the physical memory page 240 to NIC 235B of remote host 220. Accordingly, memory manager 290A may grant direct memory access to the physical memory page 240 for NIC 235A. Alternatively, such access may already have been granted.

At the time that DMA is granted for NIC 235A to physical memory page 240, the virtual memory page is mapped or pinned to the physical memory page 240. In one embodiment a timer is also started. The timer may be controlled by memory manager 290A, hypervisor 280A, OS 285A or a VM 270A-270B. If the timer expires before NIC 235A has transmitted the contents of physical memory page 240 to NIC 235B, then memory manager 290A removes the pin or lock on the virtual memory page and implements a copy-on-write policy for the virtual memory page, which may include write protecting the virtual memory page. This enables the VM 270A to request modifications to the virtual memory page mapped to physical memory page 240. Accordingly, VM 270A may perform additional operations that might alter the data in the virtual memory page without affecting the data that NIC 235A sends to NIC 235B.

Figure 3:
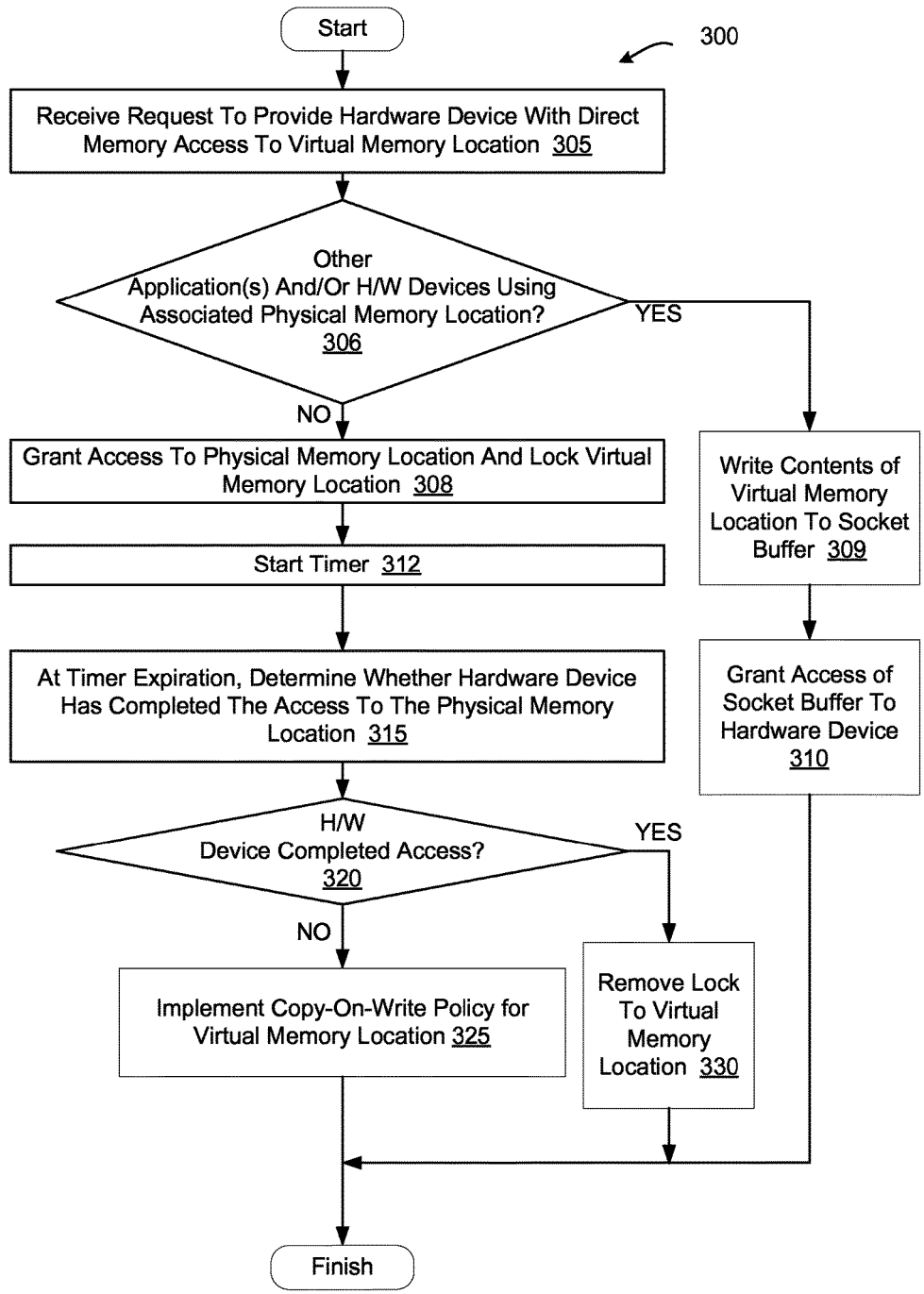
FIG. 3 is a flow diagram illustrating one embodiment for a method of providing direct memory access to memory.
Figure 4:
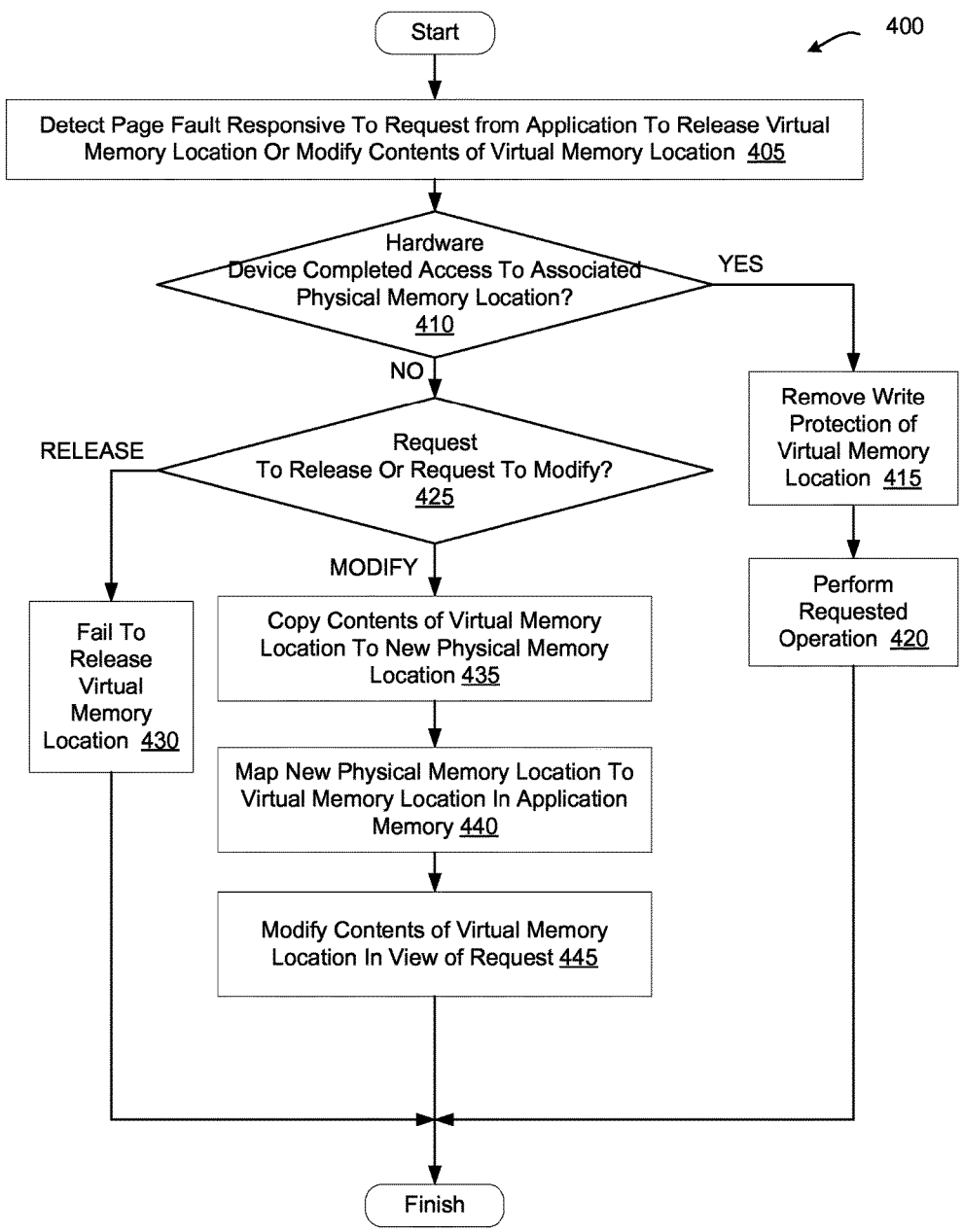
FIG. 4 is a flow diagram illustrating one embodiment of performing operations with respect to a physical memory location that has been write protected.

FIGS. 3-4 are flow diagrams of various embodiments for methods of providing zero copy transmission of data in memory pages with the ability to reclaim those memory pages. The methods are performed by processing logic that may include hardware (circuitry, dedicated logic, etc.), software (such as is run on a general purpose computer system or a dedicated machine), firmware, or some combination thereof. In one implementation, the methods may be performed by a memory manager 132 executing on a processing device 122 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events.

Referring to FIG. 3, at block 305 of method 300, processing logic receives a request from an application or guest in a virtual machine to provide a hardware device with direct memory access to a virtual memory location mapped to a physical memory location. For example, an application may request that a NIC perform a zero copy transmission of a virtual memory page in application memory of the application. At block 306, processing logic determines whether there are any other applications and/or hardware devices using the physical memory location (e.g., whether the physical memory location is mapped to memory spaces of any other application or hardware device). In one embodiment, such a determination is made by checking a reference count for the physical memory page. A reference count of 1 indicates that the physical memory page is not shared, while a reference count greater than 1 indicates that the physical memory page is shared by multiple entities. If the physical memory page is shared, the method continues to block 309. If the memory page is not shared, the method continues to block 308.

Additionally, or alternatively, at block 306 processing logic may determine whether the physical memory location is a partial memory page. If the physical memory location is a partial memory page, the method may proceed to block 309. If the physical memory location is a full memory page, the method may continue to block 308.

At block 309, processing logic writes the contents of the virtual memory location to a socket buffer (or other data buffer). At block 310, processing logic grants direct memory access of the socket buffer to the hardware device.

At block 308, processing logic grants direct memory access to the physical memory location and locks the virtual memory location to the physical memory location. At block 312, processing logic starts a timer. The timer may be started, for example, by the application or by an operating system (e.g., by a memory manager of the operating system). Alternatively, the timer may not be used to determine when to reclaim the physical memory location. In such an embodiment, the timer is not started.

At block 315, at timer expiration (or upon another condition that indicates that the physical memory location should be reclaimed) processing logic may determine whether the hardware device has completed the access to the physical memory location. Alternatively, the hardware device may send a notification (e.g., an interrupt) to processing logic once the access is complete (e.g., once a NIC completes a zero copy transmission). Processing logic may then stop the timer and/or remove the lock/pin on the virtual memory location (and associated physical memory location) in response to the notification.

If at timer expiration (or upon the other condition occurring) the hardware device has not completed its access to the memory location, then the method continues from block 320 to block 325. If at timer expiration (or upon the other condition occurring) the hardware device has completed its access to the physical memory location, the method may proceed to block 330, and the lock on the virtual memory location may be removed.

At block 325, processing logic implements a copy-on-write policy for the virtual memory location. The method then ends.

Method 400 of FIG. 4 shows operations that are performed after a copy-on-write policy has been implemented for a virtual memory page mapped to a physical memory page that is shared by an application and a hardware device that has DMA to that physical memory page (e.g., by a VM and a NIC performing a zero copy transmission of the memory page contents). Method 400 may be performed after method 300 has completed in embodiments. At block 405 of method 400, processing logic detects a page fault responsive to a request from an application to release a virtual memory location (e.g., a memory page) or to modify contents of the virtual memory location.

At block 410, processing logic determines whether the hardware device has completed access to the physical memory location (e.g., to the memory page). In one embodiment, a reference count is maintained for the physical memory location. A reference count above 1 may indicate that the hardware device is still accessing the memory location. A reference count of 1 may indicate that the hardware device has completed accessing the memory location. For example, the reference count may have been increased from 1 to 2 when a NIC requested to perform a zero copy transmission of the contents of a memory page.

The NIC may then issue an interrupt responsive to completing the zero copy transmission, and processing logic may reduce the reference count back to 1 after receiving such an interrupt. If the hardware device has completed access, the method proceeds to block 415. Otherwise the method continues to block 425.

At block 415, processing logic removes a write protection from the virtual memory location. At block 420, processing logic then performs the requested operation.

At block 425, processing logic determines whether the received request was a request to release the virtual memory location or a request to modify the virtual memory location. If the request was a request to release the memory location, then the method proceeds to block 430, and processing logic fails to release the memory location. If the request was a request to modify the memory location, then the method continues to block 435.

At block 435, processing logic copies contents of the virtual memory location to a new physical memory location. At block 440, processing logic maps the new physical memory location to the virtual memory location in the application memory for the application. The new physical memory location may be mapped to the same virtual memory location (e.g., virtual memory page) that the original physical memory location had been mapped to. Accordingly, the operations of blocks 435 and 440 may be performed transparently to the application and to the hardware device. At block 445, processing logic modifies the contents of the virtual memory location (and thus the new physical memory location) in view of the request.

Eventually the hardware device will complete its access to the physical memory location. The physical memory location will then be freed, and may no longer be used by any application or hardware device. The physical memory location will then be reused via standard garbage collection techniques.

Figure 5:
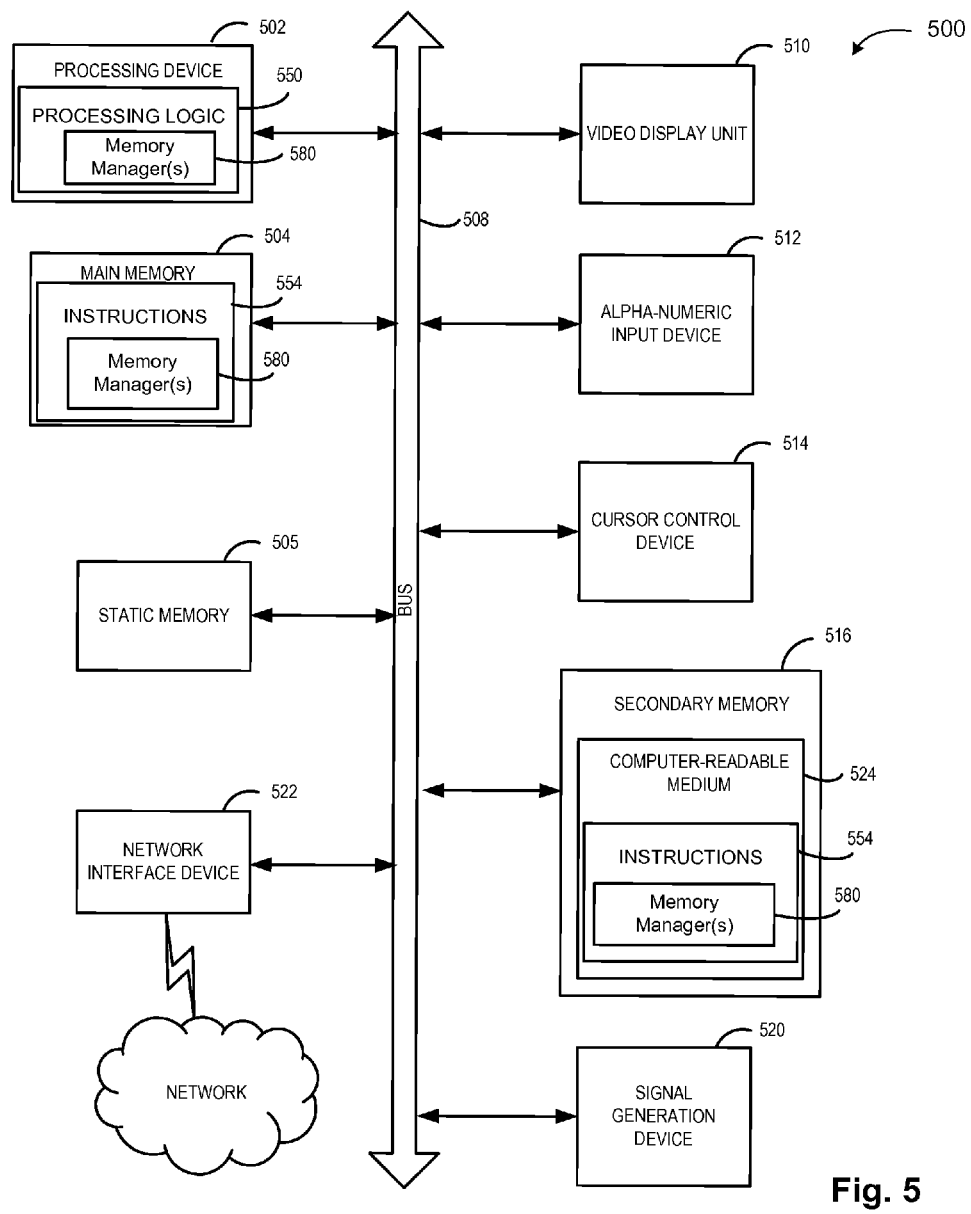
FIG. 5 illustrates a diagrammatic representation of a computing device, in accordance with embodiments.

FIG. 5 illustrates a diagrammatic representation of a machine in the exemplary form of a computer system 500 within which a set of instructions, for causing the machine to perform any one or more of the methodologies discussed herein, may be executed. The computer system 500 may correspond to computing device 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include a network interface device 522 (e.g., a network interface controller). The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions 554 embodying any one or more of the methodologies or functions described herein (e.g., memory managers 580). In one embodiment, memory managers 580 correspond to memory manager 132 of FIG. 1. The instructions 554 may also reside, completely or at least partially, within the main memory 504 and/or within the processing device 502 during execution thereof by the computer system 500; the main memory 504 and the processing device 502 also constituting machine-readable storage media.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The computer system 500 may additionally include memory management modules (not shown) for implementing the functionalities of the memory managers 580. The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components.

Some portions of the above described detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "granting", "determining", "detecting", "mapping", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   detecting, by a processing device, a request to provide a hardware device with direct memory access to memory of an application, wherein the memory comprises a virtual memory page mapped to a physical memory location that is accessible to the hardware device;
   pinning the memory of the application, wherein the pinning causes content of the virtual memory page to remain at the physical memory location;
   making, by the processing device, a determination to reclaim memory of the application in view of a timer associated with the direct memory access;
   responsive to the determination to reclaim memory, implementing, by the processing device, a copy-on-write policy for the memory of the application prior to the direct memory access completing, wherein the copy-on-write policy enables the application to update the virtual memory page and have the content remain at the physical memory location accessible to the hardware device.

2. The method of claim 1, wherein the request to provide the direct memory access to the contents of the virtual memory page comprises a request for zero copy transmission of the contents of the virtual memory page from a network interface controller (NIC).

3. The method of claim 1, wherein making the determination to reclaim memory of the application comprises:
   setting the timer responsive to the request; and
   making the determination to reclaim the memory of the application at an expiration of the timer.

4. The method of claim 1, wherein making the determination to reclaim memory of the application is further in view of an indication that the application is to reclaim a portion of the memory.

5. The method of claim 1, further comprising:
   detecting a page fault responsive to an operation of the application on the virtual memory page;
   determining whether the hardware device has completed the direct memory access at the physical memory location mapped to the virtual memory page; and
   responsive to determining that the hardware device has completed the direct memory access to the physical memory location mapped to the virtual memory page, removing the copy-on-write policy and performing the operation of the application on the virtual memory page.

6. The method of claim 1, further comprising:
   prior to pinning the memory, determining whether the physical memory location is shared with at least one of an additional application or an additional hardware device;
   responsive to determining that the physical memory location is shared with at least one of the additional application or the additional hardware device, copying the contents of the virtual memory page to a socket buffer; and
   responsive to determining that the physical memory location is not shared with at least one of the additional application or the additional hardware device, proceeding with pinning the content of the virtual memory page at the physical memory location.

7. The method of claim 1, further comprising responsive to the request, granting the direct memory access for the hardware device to the physical memory location mapped to the virtual memory page.

8. A non-transitory computer readable medium comprising instructions that, when executed by a processing device, cause the processing device to:
- detect a request to provide a hardware device with direct memory access to memory of an application, wherein the memory comprises a virtual memory page mapped to a physical memory location that is accessible to the hardware device;
- pin the memory of the application, wherein to pin the memory causes content of the virtual memory page to remain at the physical memory location;
- make a determination to reclaim memory of the application in view of a timer associated with the direct memory access;
- responsive to the determination to reclaim memory, implement a copy-on-write policy for the memory of the application prior to the direct memory access completing, wherein the copy-on-write policy enables the application to update the virtual memory page and have the content remain at the physical memory location accessible to the hardware device.

9. The non-transitory computer readable medium of claim 8, wherein the request to provide the direct memory access to the contents of the virtual memory page comprises a request for zero copy transmission of the contents of the virtual memory page from a network interface controller (NIC).

10. The non-transitory computer readable medium of claim 8, wherein the determination to reclaim memory comprises the processing device to:
- start the timer responsive to the request; and
- make the determination to reclaim the memory of the application at an expiration of the timer.

11. The non-transitory computer readable medium of claim 8, wherein to make the determination to reclaim memory of the application the processing device is further to receive an indication the application is to reclaim a portion of the memory.

12. The non-transitory computer readable medium of claim 8, wherein the processing device is further to:
- detect a page fault responsive to an operation of the application on the virtual memory page;
- determine whether the hardware device has completed the direct memory access at the physical memory location mapped to the virtual memory page; and
- responsive to determining that the hardware device has completed the direct memory access to the physical memory location, remove the copy-on-write policy and perform the operation of the application on the virtual memory page.

13. The non-transitory computer readable medium of claim 8, wherein to detect the request, the processing device is to execute an operating system that receives the request from the application.

14. The non-transitory computer readable medium of claim 8, wherein to detect the request, the processing device is to execute a hypervisor that receives the request from a guest operating system.

15. The non-transitory computer readable medium of claim 8, wherein the processing device is further to:
- prior to pinning the memory, determine whether the physical memory location is shared with at least one of an additional application or an additional hardware device;
- responsive to determining that the physical memory location is shared with at least one of the additional application or the additional hardware device, copy contents of the virtual memory page to a socket buffer; and
- responsive to determining that the physical memory location is not shared with at least one of the additional application or the additional hardware device, proceed with pinning the virtual memory page.

16. The non-transitory computer readable medium of claim 8, wherein the processing device is further to grant the direct memory access for the hardware device to the physical memory location mapped to the virtual memory page responsive to the request.

17. A computing device comprising:
- a data storage comprising a physical memory location;
- a network interface controller (NIC) coupled to the data storage; and
- a processing device operatively coupled to the data storage and to the NIC, the processing device to:
  - detect a request to provide the NIC with a zero copy transmission of contents of a memory of an application, wherein the memory comprises a virtual memory page mapped to the physical memory location;
  - pin the memory of the application, wherein to pin the memory causes content of the virtual memory page to remain at the physical memory location;
  - make a determination to reclaim memory of the application in view of a timer associated with the direct memory access;
  - responsive to the determination to reclaim memory, implement a copy-on-write policy for the memory of the application prior to the direct memory access completing, wherein the copy-on-write policy enables the application to update the virtual memory page and have the content remain at the physical memory location accessible to the hardware device.

18. The computing device of claim 17, wherein to make the determination to reclaim memory the processing device is to:
- start the timer responsive to the request, and
- make the determination to reclaim the memory of the application at an expiration of the timer.

19. The computing device of claim 17, wherein to make the determination to reclaim memory the processing device is to receive an indication that the application is to reclaim a portion of the memory.

20. The computing device of claim 17, wherein the processing device is further to:
- detect a page fault responsive to an operation of the application on the virtual memory page;
- determine whether the NIC has completed the transmission; and
- responsive to determining that the NIC has completed the transmission, remove the copy-on-write policy and perform the operation of the application on the virtual memory page.

* * * * *